US005931482A

United States Patent [19]

Chirgwin

[11] Patent Number: 5,931,482

[45] Date of Patent: Aug. 3, 1999

[54] SHOPPING CART FINGER SAFETY DEVICE

[76] Inventor: Keith William Chirgwin, 57 West St., Goshen, Mass. 01096

[21] Appl. No.: 08/947,698

[22] Filed: Oct. 9, 1997

[51] Int. Cl.$^{6}$ .......... B62B 3/02

[52] U.S. Cl. .......... 280/33.992; 280/33.993

[58] Field of Search .......... 220/485; 280/33.992, 280/33.993, 33.996, 33.997; 293/121, 102, 120, 142, 143; 16/114 R

[56] References Cited

U.S. PATENT DOCUMENTS

| | | | |
|---|---|---|---|
| 2,398,436 | 4/1946 | Mason | 16/114 R |
| 3,677,570 | 7/1972 | Hedu | 280/33.992 |
| 4,466,377 | 8/1984 | Kolb et al. | 16/114 R |
| 5,115,530 | 5/1992 | Distiso | 16/114 R |
| 5,221,014 | 6/1993 | Welch et al. | 211/187 |
| 5,340,133 | 8/1994 | Trubiano | 280/33.992 |
| 5,415,448 | 5/1995 | Keathley | 16/114 R |
| 5,553,876 | 9/1996 | Trubiano | 280/33.992 |
| 5,722,672 | 3/1998 | Frederick | 280/33.992 |
| 5,771,536 | 6/1998 | Sieg et al. | 16/114 R |
| 5,803,681 | 9/1998 | Landwerlen | 16/114 R |

FOREIGN PATENT DOCUMENTS

| | | | |
|---|---|---|---|
| 2649-150 | 1/1991 | France | 16/114 R |

*Primary Examiner*—Richard M. Camby

*Attorney, Agent, or Firm*—John C. Serio

[57] ABSTRACT

A child safety device used to restrict a young child and provide protection against injury that occurs from the popular construction of a modern shopping cart. A safety device that can be attached to the conventional shopping cart to prevent a child from injuring his or her digits in the openings that exist in modern shopping carts. The safety device is easy to manufacture and readily adaptable to a variety of shopping carts that are presently in use in retail settings. A child safety device that is economical to child-proof existing shopping carts without having to redesign or remanufacture expensive shopping carts. The safety device easily secures to the back rail section of the area of the cart that is directly opposite the seated child without restricting his or her natural movement.

9 Claims, 4 Drawing Sheets

15 11 16 14 12

24
11
18
17
23

SHOPPING CART FINGER SAFETY DEVICE

BACKGROUND OF INVENTION

Supermarkets and many other large retail stores provide shopping carts for the convenience of their customers. These carts generally have a built-in seat for small children which faces the handle or rear area of the cart allowing the child to grasp the wire frame. Safety and security devices to restrain the child in the seat are well known in the prior art, however, none are particularly intended to prevent the child from sticking his fingers and hands through the metal bars. There have been many instances where children have done so and become entrapped. A need exists for a safety device to prevent small children from becoming entrapped in the wire bars in front of the seat in these carts. It is, therefore, the object of the present invention to provide such a shopping cart safety device incorporating the utmost safety features, ease of installation, and affordability to the provider of the carts.

Some examples of the prior art safety and security devices and others structured for supporting articles, are set forth in the patents briefly described below:

The Mandrecchia U.S. Pat. No. 4,854,607 shows a harness for small children adapted to secure a child to an independent structure such as a shopping cart. The harness further has a strap and tether unit to lock the child to the shopping cart. The harness of the Mandrecchia patent safely secures the child from abduction and does protect the child from moving about in the seat, however it does not prevent the harnessed child from sticking his hands and fingers through the wire bars and becoming entrapped.

The Thinnes U.S. Pat. No. 4,621,589 also shows a security device for children which attaches to a conventional shopping cart and restricts the distance a child can wander from the parent or guardian. The harness further has a reel attached to the shopping cart by a lock. The purpose of the harness is to safely secure the child from abduction, however the Thinnes patent does not restrict the movement of the child within the seat of the shopping cart or protect his fingers and hands in any way.

The Zimmerman U.S. Pat. No. 4,666,017 illustrates a child's safety harness for use in crowded places with high density population. The safety harness is for use when the child is actively moving about and not secured in a seated position.

The Lewis U.S. Pat. No. 2,208,990 shows a safety belt with a reinforcing structure meant to fit around the body in a manner similar to a harness; however, the device does not surround the body to secure it within a structure such as the modem shopping cart.

The Weis U.S. Pat. No. 758,123 illustrates a harness used in connection with a child's carriage. The front body of the harness is secured around the upper back and side straps extend downward to hook to the carriage. However, the harness was used to restrain a child within a moving carriage during the early 1900's and is not readily adaptable to a modern shopping cart.

SUMMARY

The principal object of the present invention is to provide a hand and finger safety device that protects a small child seated in the shopping cart from becoming entrapped in the wire bars in front of the seating area.

It is also an object of the present invention to provide a safety device which is simple, easy to install and affordable for the manufacturer or the provider of the carts.

A further object of this new invention is to provide a safety device constructed for use on a modern shopping cart having a frame mounted on wheels and including a general vertical frame member on a similar independent structure.

The foregoing object can be accomplished by constructing a safety device that forms a solid cover over the wire bars in front of the seat of the cart. The construction of this device can be accomplished by constructing said cover from plastic or other suitable material that will allow forming the above suitable materials in a method in which said cover can be secured upon the wire frame of a shopping cart. The cover as described above is fashioned in a way that allows the cover to be adaptable to a variety of shopping carts to prevent young children from entrapping their fingers within the wire bars. The above cover is so constructed that it adapts interchangeably with a wide array of carts utilizing a wire frame construction or plastic molded construction. Said cover is retrofitted to the modem shopping cart by having both a front cover and a back cover. Said back cover is secured to the front cover with the wire frame of the shopping cart positioned between said front and back covers. The said back cover having openings in which male fasteners pass through and insert into female fasteners in said front cover. The said front cover is equipped with a surface area in which interchangeable advertising material can be inserted. Furthermore, said area for advertising can be constructed by mechanical methods or with an electronic display screen.

DESCRIPTION OF PREFERRED EMBODIMENTS

Figure 1:
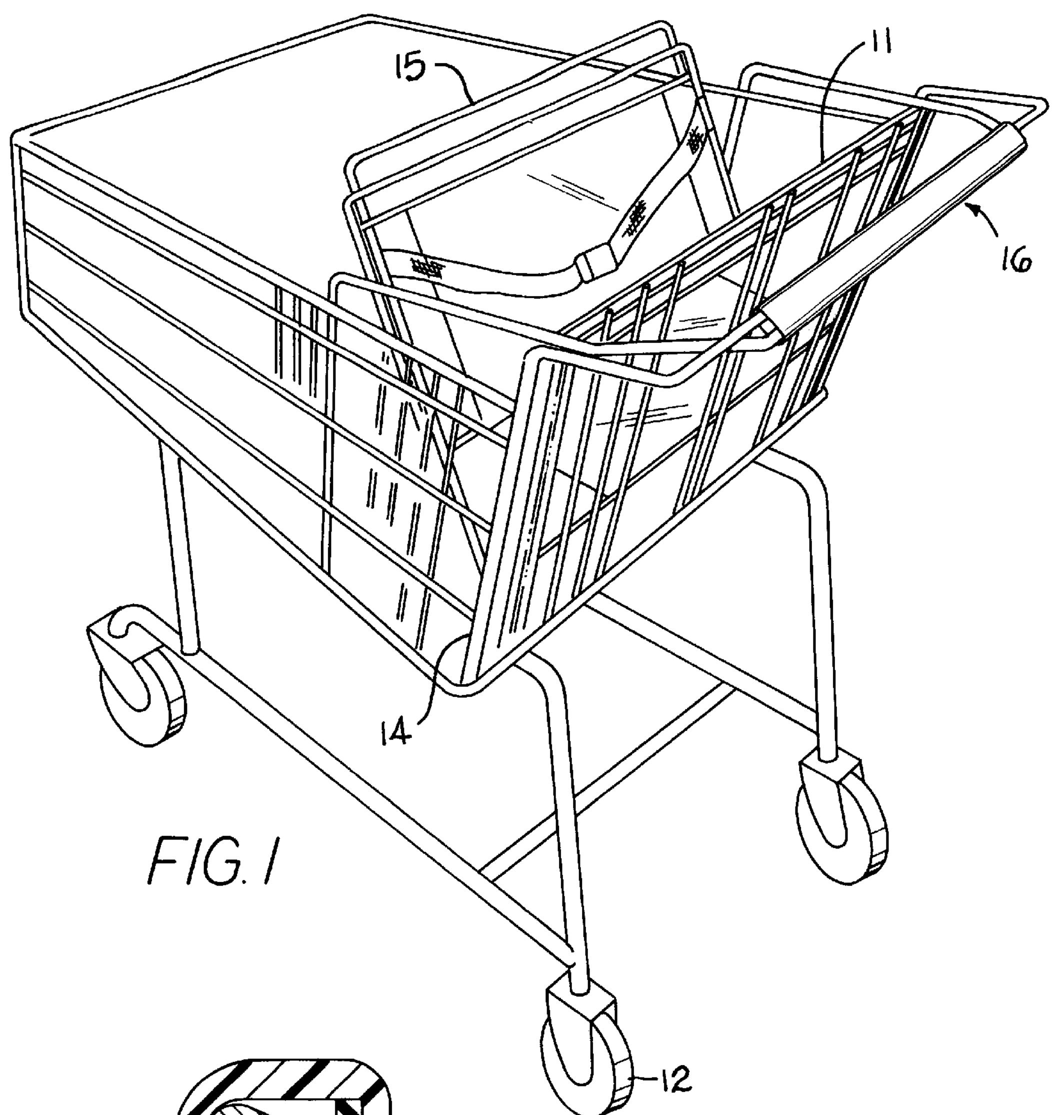
FIG. 1 is a perspective view of a wire shopping cart showing the seating area used for small children.

Referring now to the drawings, and more particularly to FIG. 1, there is shown a modern shopping cart mounted on wheels (12), with a vertical frame (14), a fold down seat (15) with a horizontal bar (16) or the shopping cart handle as the basic structure. Opposite the cart handle is the area that constitutes the back rail section (11) of the wire frame. This back rail portion (11) forms the area that is directly in front of a child placed within the fold down seat (15) of the cart. This back rail section (11) is formed from the intersections of horizontal and vertical wire rods. This back rail section (11) is so constructed as to allow sufficient gaps in which a child will naturally insert his or her fingers as he or she reaches forward for stability or in the natural curiosity of a child to poke their digits through the openings in the frame.

Because of the natural swelling of digits that may occur after insertion through the openings present in the back rail section (11) children often become entrapped.

Figure 2:
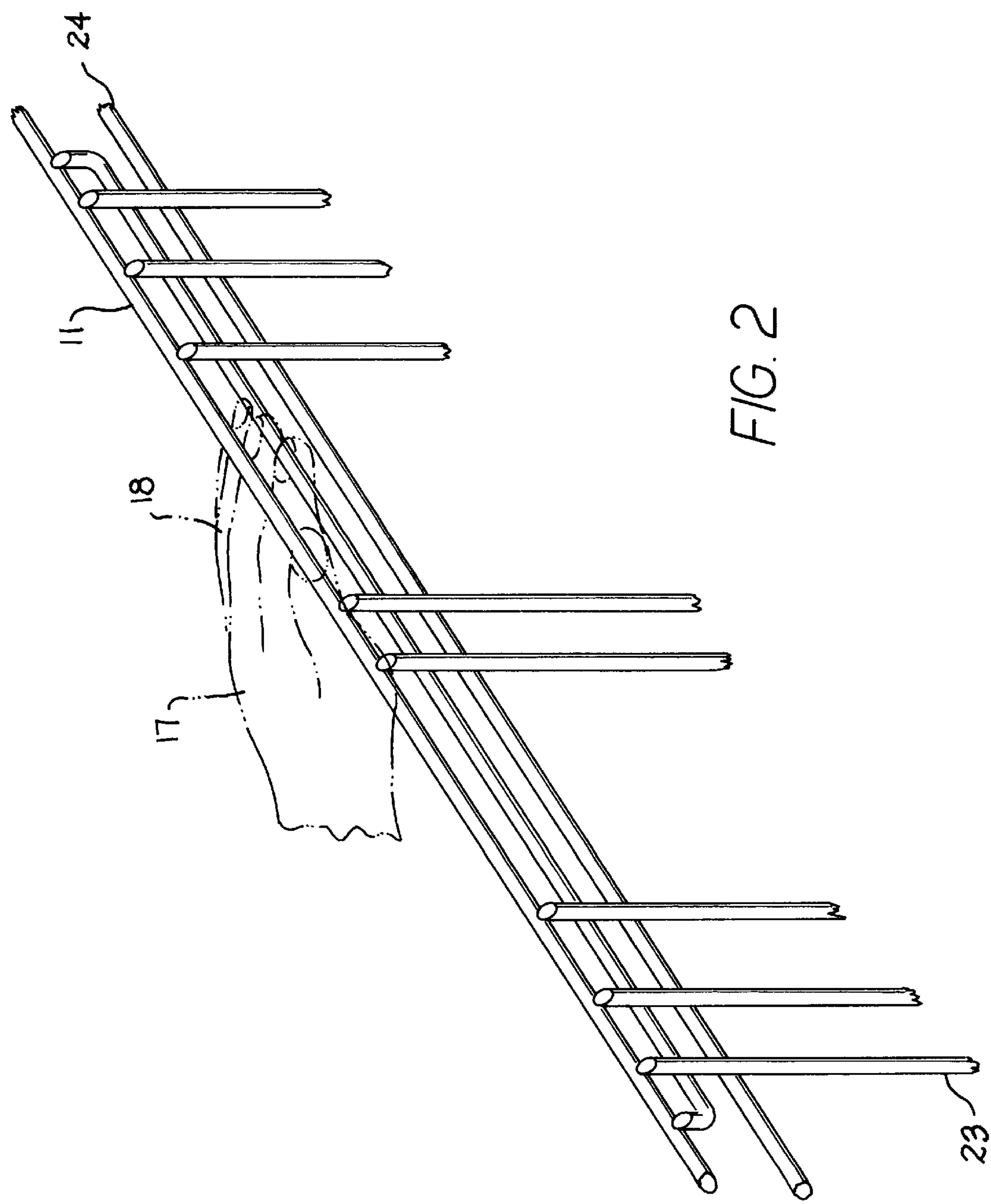
FIG. 2 is fragmented perspective view of the top section of the wire shopping cart located directly in front of the child seating area.

In FIG. 2, a fragmented view is shown of the upper portion of the wire shopping cart frame (14), wherein a child's hand (17) and digits (18) are protruding through the unprotected back rail section (11) of the said frame (14). Furthermore the vertical rods (23) are shown intersecting with the horizontal rods (24) to form the back rail portion (11).

Figure 3:
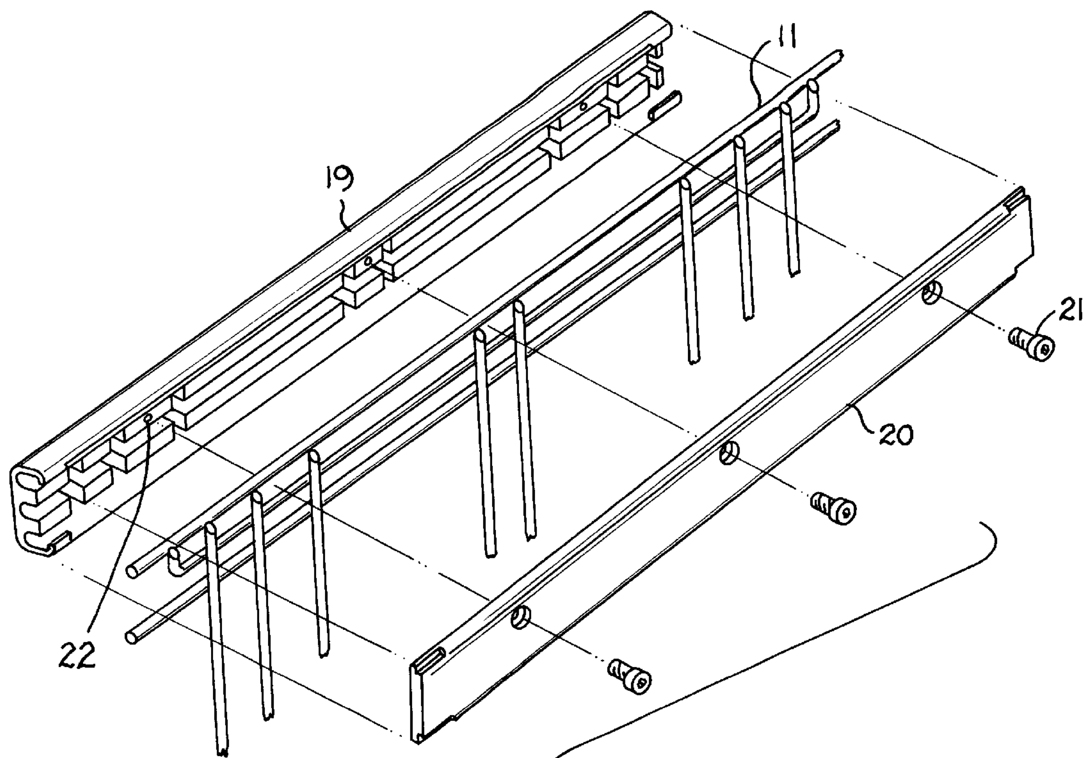
FIG. 3 is a cut away view of the present finger safety device showing the internal construction and the method of attachment to the wire shopping cart.

Referring now to FIG. 3, the preferred safety device, in accordance with the present invention, is comprised in a way that attaches to the rear of the cart as shown in FIG. 1 in the back rail section (11) of the vertical frame (14) of said cart in front of the fold down seat (15). The preferred safety device consists of two sections, a front member (19) and a back member (20) which can be fashioned from plastic or other suitable material such as wood, fiberglass, or alloy metals. The approximate length of the safety device is 18 inches but can be extended to accommodate larger carts or shortened for smaller carts. The present device is comprised of a front member (19) and a back member (20) to be attached to the back rail section (11) by the use of male fasteners (21) one at each opposing end and one equal distance from the opposing ends in the middle of the present device. Said male fasteners (21) may be fashioned from alloy metal or plastic. Said male fasteners (21) are coupled to a female counterpart (22) in the front member (19) of the preferred safety device. It is preferred that said male fasteners (21) are fashioned so that when they are fully inserted they are flush with the outer surface of the back member (20). Additionally, the outer surface of the front member (19) provides a surface area where advertising materials can be placed or amusing childhood characters can be displayed.

Figure 4:
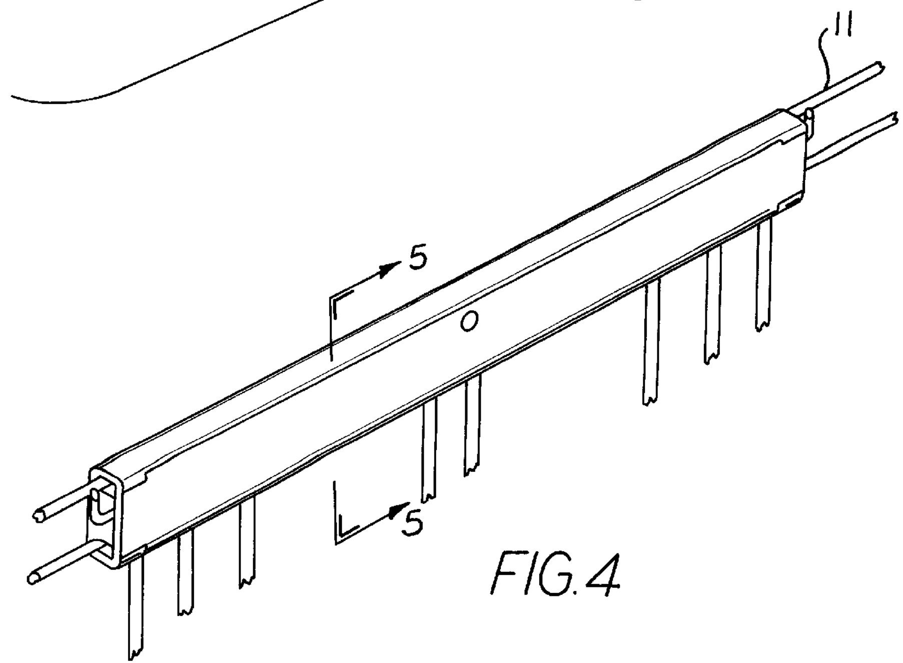
FIG. 4 is a fragmented perspective view of the present invention as shown in FIG. 3 as fully installed on the shopping cart.

Referring now to FIG. 4, a view of the fully installed present safety device as attached to the back rail section (11) described in the FIG. 3 embodiment.

Figure 5:
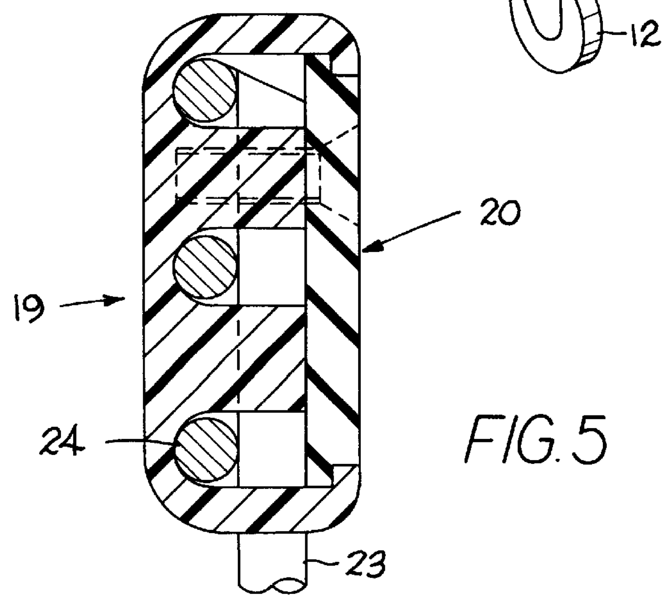
FIG. 5 is a fragmented top view of the present invention as installed on the shopping cart.

FIG. 5 is a cross-section view of the preferred safety device as shown interlocking with the horizontal (24) and vertical (23) wire rods of the back rail section (11) of the cart. The front member (19) and the back member (20) are also depicted.

Figure 6:
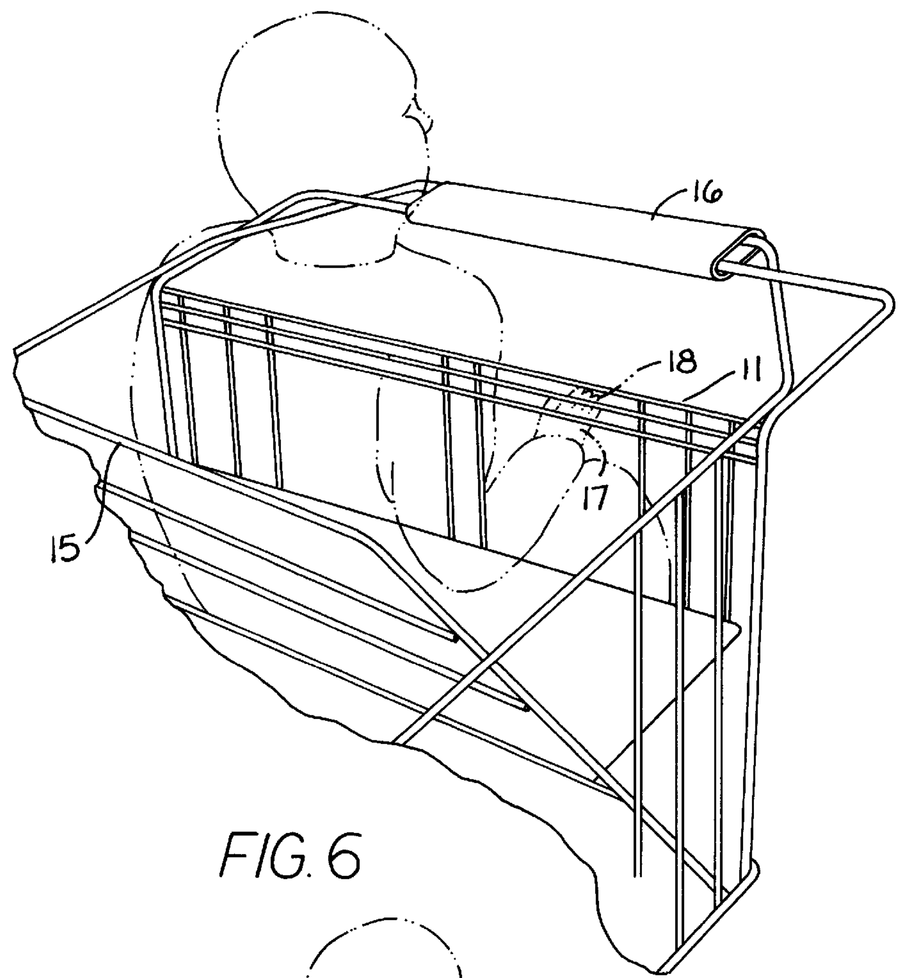
FIG. 6 is a fragmented back view of a child seated in a shopping cart with his fingers protruding through the wire frame.

FIG. 6 is a cut-away back view of a child seated in the fold down seat (15) of the shopping cart with his hand (17) and digits (18) protruding through the unprotected back rail section (11) of the cart.

Figure 7:
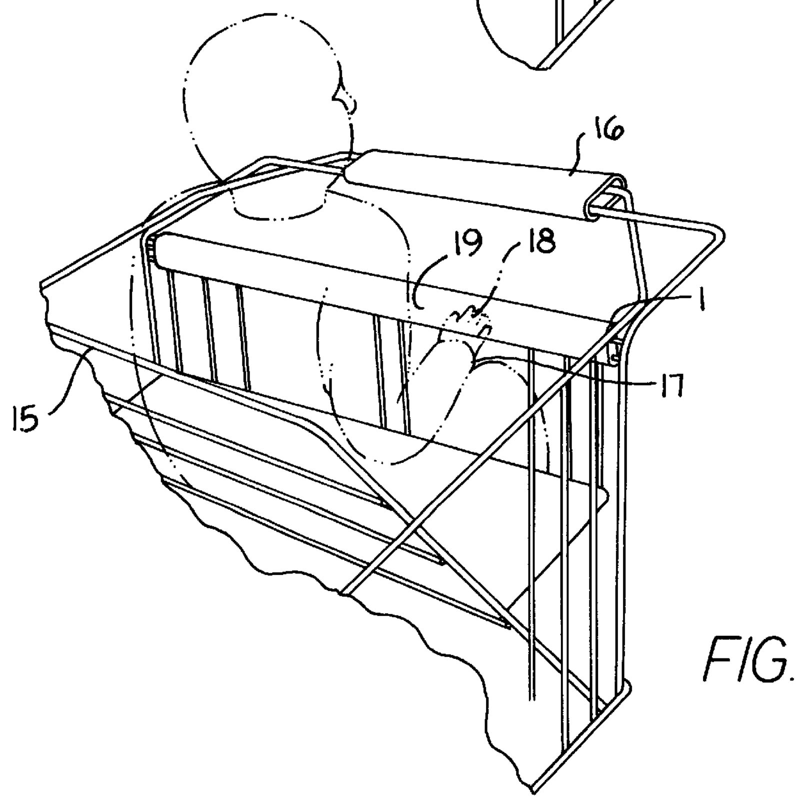
FIG. 7 is a fragmented back view of a child seated in a shopping cart equipped with the present finger safety device.

Referring now to FIG. 7, a cut-away back view of a child seated in the fold down seat (15) with the preferred safety device installed on the back rail section (11) of the shopping cart showing the effectiveness of the preferred safety device and his or her inability to insert his or her digits (18) and hand (17) within the back rail section (11).

It is the object of the new invention to provide a new safety device suitable for small children, which is attachable to a modem shopping cart in manner that will prevent injury to children while not infringing upon the child's natural curiosity during normal activities. When the guardian of the child is shopping it is often difficult to keep a small child from poking their digits through openings in the cart that are within their reach. For the rambunctious child or the child in a stage of development that is experiencing the natural progression and development of hand to mouth activities through no fault of the young child's behavior the guardian is often faced with the problem of manipulating the cart and attending to the child. While previous safety devices have restricted the mobility of the child none have addressed the problems that have resulted from the construction of the back rail section (11) of the shopping cart. While the guardian is preoccupied with shopping activities, it is not unusual for the child to poke their digits (18) through this back rail portion (11) causing an unsafe environment with possible injury resulting. The safety device may, as an alternative, be provided by the store as a permanent part of the modern shopping cart by permanently securing the safety device to the back rail section (11) opposite the fold down seat (15). The present invention can be easily manufactured and retrofitted to shopping carts that are presently in use at economical cost.

A further object of the invention is to provide a space within the shopping cart for the display of advertising materials that can be directed to either the guardian or the child seated in the cart. Additionally, these advertising materials may be fashioned from traditional printed graphics to display either advertising messages or entertainment in the form of popular childhood characters.

What is claimed:

1. A shopping cart finger guard for use in combination with a shopping cart having a basket with a back wall behind a folding seat, the back wall having a top with at least two horizontal wires and a plurality of vertical wires, the finger guard to be mounted on the rear top wall of the shopping cart to prevent small children from injuring their fingers, the shopping cart finger guard comprising:

- a straight backing member having a plurality of openings to accommodate fastening to be couple to the basket;
- a straight frontal member having female fastening receptacles to receive male fasteners;
- a plurality of fasteners for releaseably fastening the backing member, each fastener comprising a male fastener member so as to fasten the backing member to the frontal member.

2. A finger safety guard as claimed in claim 1 wherein said front member and back member are formed of plastic material.

3. A finger safety guard as claimed in claim 1 wherein said front member and back member are formed from fiberglass materials.

4. A finger safety guard as claimed in claim 1 wherein said front member and back member are formed from wood products.

5. A finger safety guard as claimed in claim 1 wherein said front member and back member are formed from aluminum.

6. The finger safety guard as claimed in claim 1 wherein said front member and back member are formed from stainless steel.

7. The finger safety guard as claimed in claim 1 wherein said front member and back member are formed from steel.

8. The finger safety guard as claimed in claim 1 wherein said front member and back member are formed from tin.

9. A finger safety guard as claimed in claim 1 wherein said from member is fashioned to display advertising materials.

* * * * *